UNITED STATES PATENT OFFICE.

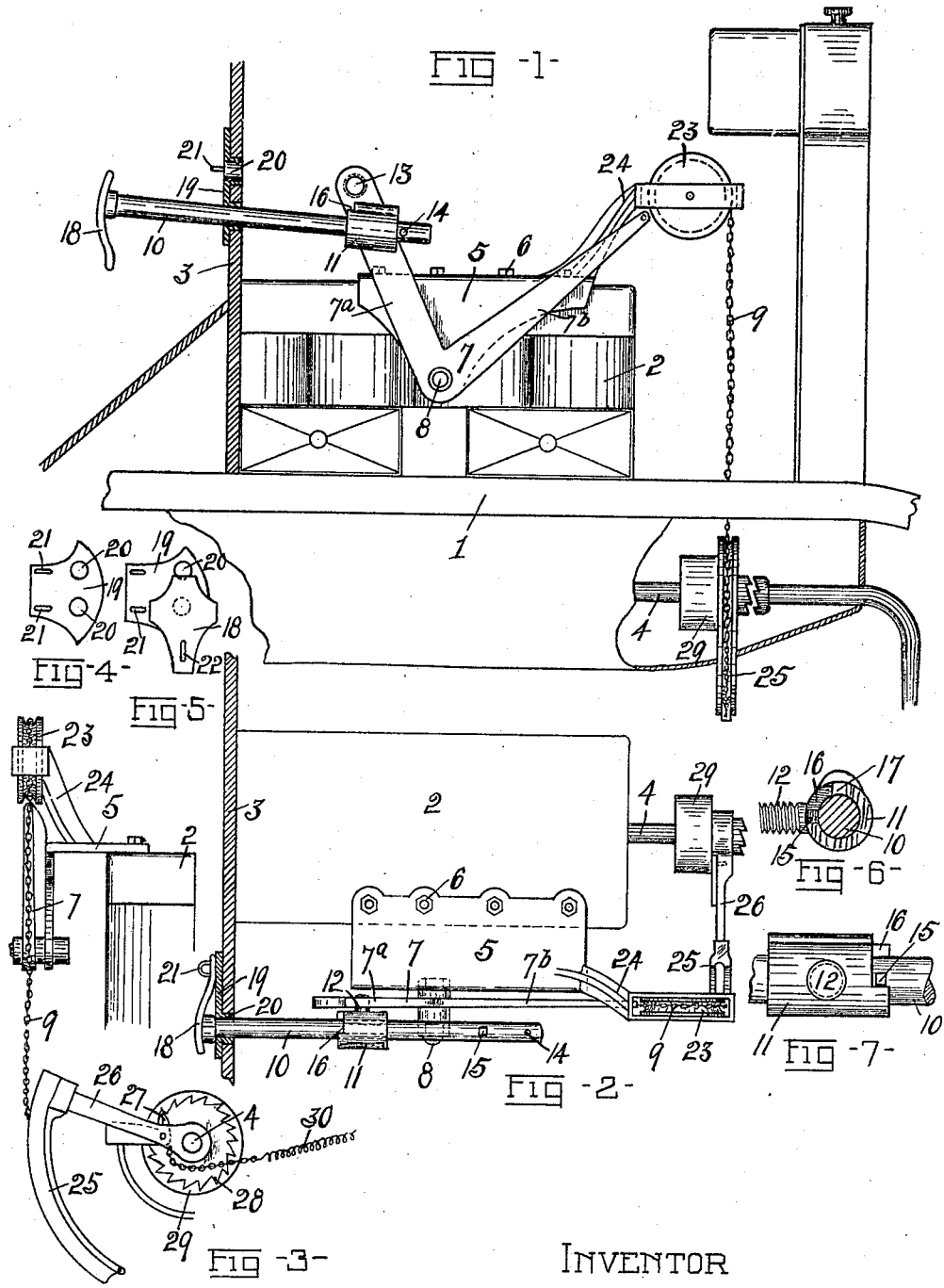

JULIUS W. KNOPP, OF TOLEDO, OHIO.

ENGINE-STARTING DEVICE.

1,321,057.      Specification of Letters Patent.      Patented Nov. 4, 1919.

Application filed February 24, 1919. Serial No. 278,751.

*To all whom it may concern:*

Be it known that I, JULIUS W. KNOPP, a citizen of the United States, and a resident of Toledo, in the county of Lucas and State of Ohio, have invented a certain new and useful Engine-Starting Device; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to engine starters, and particularly to those of the mechanical type.

The object of my invention is the provision of a simple and efficient starting means for automobile engines, which means is manually operated from the driver's seat and is capable of being easily and quickly attached to and removed from an engine.

The invention is fully described in the following specification, and while, in its broader aspect, it is capable of embodiment in numerous forms, a preferred embodiment thereof is illustrated in the accompanying drawings, in which,—

Figure 1 is a side elevation of an automobile engine and a portion of the automobile carrying the same, with parts of the latter broken away and with a starting device, embodying my invention, associated therewith. Fig. 2 is a top plan view of the portion thereof, with the control rod for the starter in inoperative position. Fig. 3 is a front elevation of the starting means and a portion of the engine with which associated. Fig. 4 is an elevation of the dash-plate through which the control rod projects. Fig. 5 is a similar view thereof with the control rod in position therein. Fig. 6 is a rear elevation of the swivel sleeve of the cranking means through which the control rod projects, with said rod in section, and Fig. 7 is an inner side elevation thereof with the control rod fragmentarily shown.

Referring to the drawings, 1 designates the frame and 2 the engine of an automobile, 3 the customary dash at the rear of the engine, and 4 the engine crank shaft.

Secured to the side of the engine which is in advance of the driver's seat is a bracket 5 of inverted L form in cross section with its upper inwardly projecting flange or edge portion extending over the adjacent top edge of the engine and secured thereto by bolts or screws 6, which, in the case of an engine, for instance of the "Ford" type, having a removable cap, comprise the screws for securing the cap to the engine body or cylinders. In securing the bracket 5 to an engine of this type, it is only necessary to remove a few of the cap screws thereof and then to replace the same through the apertures provided therefor in the brackets.

A bell crank lever 7 is fulcrumed to a pivot stud or bolt 8 projecting laterally from the downwardly projecting flange of the bracket 5, the arm 7ª of the lever being connected to the control rod of the starting mechanism as hereinafter described, and the arm 7ᵇ of said lever being connected by a chain or draft member 9 to the ratchet member of the device associated with the engine crank shaft.

The control rod is designated 10 and slidingly projects through an aperture provided therefor in the dash 3 and has its forward end slidingly projected through a sleeve 11 that is swiveled to the arm 7ª of the lever 7, as for instance by threading a stud 12 projecting laterally from said sleeve into a receiving opening 13 in the lever arm. One or more of these openings may be provided in the lever arm to facilitate adjustment to suit the length of throw which it is desired to impart to the lever and the distance from the lever fulcrum at which it may be desired to position the point of attachment of the control rod, or to suit the height at which it may be desired to project the rod through the dash. The rod 10 is provided at its forward end with two longitudinally spaced stop lugs 14 and 15, which are positioned at opposite ends of the sleeve 11 to coact therewith to prevent longitudinal movements of the control rod relative thereto. The sleeve 11 is provided at its rear end with a quarter notch 16 in which the stud 15 is disposed and which coöperates with said stud to permit the rod to have only a quarter turning movement relative to the sleeve. The stud 15, when at one end of the notch 16, registers with a recess or groove 17 provided longitudinally through the sleeve 11 internally thereof and which permits a movement of the lug 15 forward through the sleeve when it is desired to place the control rod in inoperative position, as shown in Fig. 2. The rear end of the control rod is provided with a foot piece or pressure plate 18.

The dash 3, in the present instance, is provided with a bearing plate 19 having two vertically spaced bearing openings 20 therethrough for the control rod 10, the lower opening being used when the swivel-sleeve 11 is secured to the lower opening 13 in the lever 7 and the upper of said openings 20 being used when said sleeve is secured to the upper of the openings 13. A padlock engaging loop 21 projects from the dash plate 19 opposite each opening 20 therein and the pressure plate 18 is provided at one end with a slot 22, which when the control rod 10 is in inoperative position, is adapted to receive the associated loop 21 so that the control rod may be locked in inoperative position by a padlock inserted through said loop.

The draft chain or member 9 extends from an arm 7$^b$ of the lever 7, up and over a sheave 23 that is carried by an arm 24 projecting upward and forward from the bracket 5, and the lower end of said chain passes around the peripherally grooved portion of a segment 25, which is carried by an arm 26 projecting loosely from the crankshaft 4 radially thereof. The arm 26 carries a pawl 27, which upon an upward stroke of the arm engages in one of a series of internal ratchet teeth 28 provided on a ratchet-wheel 29 fixed to the shaft 4. The arm 26 is normally held in lowered or retracted position by a spring 30, which connects the same with an adjacent standard part (not shown).

It is evident with my invention that the control rod 10 may be easily and quickly placed in either operative or inoperative positions, and that when in operative position the gravity action of the pressure plate 18, which is heavier at one end than the other, automatically retains the lug 15 on the control rod out of register with the recess 17 in the sleeve so that a forward longitudinal pressure exerted on the control rod will impart an engine cranking movement to the lever 7, such movement being communicated to the crank shaft through the draft member 9 and ratchet connection between it and the shaft. The stroke of the lever 7 is sufficient to impart a half turn to the engine shaft.

I wish it understood that my invention is not limited to any specific construction, arrangement or form of the parts in so far as such limitations are specified in the claims.

Having thus described my invention, what I claim as new, and desire to secure by Letters Patent, is—

1. The combination with an automobile engine, of a bracket secured to the engine top and projecting outwardly and downwardly therefrom, said bracket having an arm projecting from its forward end, a sheave carried by said arm, a bell crank lever fulcrumed to said bracket, a draft member extending from one arm of said lever over said sheave and downwardly therefrom, a ratchet connection between said member and the engine shaft, and a pressure rod connected to said lever and extending rearwardly therefrom adjacent to the operator's seat in the automobile.

2. The combination with an automobile engine, of a bracket projecting from the top edge of the engine and secured thereto by some of the cap screws of the engine, a sheave carried by said bracket, a bell crank lever fulcrumed to said bracket, a draft member extending from one arm of said lever over said sheave and outwardly therefrom, a ratchet connection between said member and engine shaft, and means having connection with said lever and operable from adjacent to the operator's seat in the automobile to rock said lever to impart a turning movement to the engine shaft.

3. The combination with an automobile, of a bracket secured to its engine at one side thereof, a lever fulcrumed to said bracket, connection between said lever and the crank shaft of the automobile engine adapted to impart cranking movements to the shaft when the lever is rocked in one direction, a swivel sleeve carried by one arm of said lever, a pressure rod carried by and projecting rearwardly from said sleeve to operable position, said rod and sleeve having coöperating portions which prevent relative longitudinal movements thereof when the rod is in one position and which permits such relative movements when the rod is in a different position relative to the sleeve.

4. The combination with an automobile engine, of a bell crank lever fulcrumed adjacent to one side thereof, connection between one arm of said lever and the engine crank shaft operable to impart a cranking movement to said shaft when the lever is rocked in one direction, a swivel sleeve carried by the other arm of said lever and having a quarter notch in its rear end and an internal recess extending longitudinally therethrough from one portion of said notch, a control rod loosely projected through said sleeve and having a stop lug working in said quarter notch and adapted, when in one position relative to said notch, to register with and be moved through said recess to permit longitudinal movements of the pressure rod to and from operative position relative to the sleeve.

5. The combination with an automobile engine, of a bell crank lever fulcrumed at one side thereof, connection between one arm of said lever and the engine crank shaft operable to impart cranking movements to the shaft when the lever is rocked in one direction, a swivel sleeve carried by the other arm of said lever, a control rod projecting through said sleeve and movable into and out of operative position relative thereto, and means for rocking the control rod in inoperative position.

In testimony whereof, I have hereunto signed my name to this specification.

JULIUS W. KNOPP.

Copies of this patent may be obtained for five cents each, by addressing the "Commissioner of Patents, Washington, D. C."